United States Patent Office 3,839,449
Patented Oct. 1, 1974

3,839,449
PROCESS FOR THE PREPARATION OF
N,O-DIALKYLHYDROXYLAMINES
Juerg Herold, Monthey, Switzerland, assignor to
Ciba-Geigy AG, Basel, Switzerland
No Drawing. Filed Mar. 18, 1971, Ser. No. 125,829
Claims priority, application Switzerland, Mar. 20, 1970,
4,280/70
Int. Cl. C07c 85/00, 119/00
U.S. Cl. 260—566 R    32 Claims

ABSTRACT OF THE DISCLOSURE

A process for the preparation of a N,O-dialkylhydroxylamine, which comprises the steps of
(A) reacting hydroxylamine, a salt of hydroxylamine or a hydroxylamine disulphonate with an aldehyde or a ketone;
(B) alkylating the oximino compound obtained in (A) with an alkylating agent;
(C) quaternising the product obtained in (B) with an alkylating agent with exclusion of moisture at a temperature in the range of from 50° to 140° C. to obtain a N-alkylidene-N,O-dialkylammonium salt of the formula $$\left[ \begin{array}{c} \diagdown \\ \diagup \end{array} C=N-\text{alkyl}'' \atop \text{Oalkyl}' \right]^+ Z^-$$

in which alkyl' and alkyl'' represent the alkyl radicals introduced in steps (B) and (C) and Z represents the radical originating from the quaternising agent; and
(D) hydrolysing the N-alkylidene-N,O-dialkyl-ammonium salt obtained in (C) under acid conditions to obtain a N,O-dialkyl-hydroxylamine.

---

This invention relates to a simplified and cheapened process for the preparation of N,O-dialkylhydroxylamines, which are important intermediate products, for example in the synthesis of urea derivatives which are mostly herbicidally active and can be used in plant protection.

It has been proposed to hydrogenate nitromethane catalytically to N-methylhydroxylamine, to react this with an aldehyde or a ketone to give a N-methylnitrone of the formula

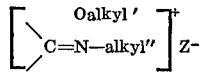

and to convert the nitrone by means of an alkylating agent into a quaternary ammonium salt

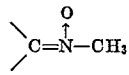

(in which alk represents an alkyl group), which can be hydrolysed to yield N-methyl-O-alkylhydroxylamine, the aldehyde or ketone employed being simultaneously recovered (Swiss Pat. No. 405,268 and German Published Specification No. 1,518,081).

The disadvantage of this process is not only that it involves the hydrogenation under pressure of nitromethane with, for example, Pd/C, to give N-methyl-hydroxylamine, which in turn must be trapped by an acid and reliberated, but also primarily that it involves the use of nitromethane as such, which, because of its explosive tendency, can only be handled safely in small amounts. On a larger industrial scale there is a latent danger of explosion despite comprehensive safety precautions. This process has the further disadvantage that when using nitromethane, the methyl group present on the N atom is carried over to and therefore in a predetermined position in the end product.

The present invention is based on the observation that N,O-dialkylhydroxylamines can be obtained in a simple manner, without the use of nitromethane, and with identical or different alkyl substituents as desired, if the following reaction sequence preferably including the preliminary step, which starts from materials easily accessible on a large industrial scale is adopted:

Preliminary step $M_1HSO_3 + M_2NO_2 + SO_2 \longrightarrow$

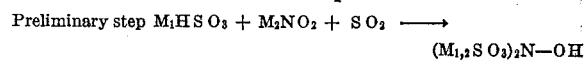

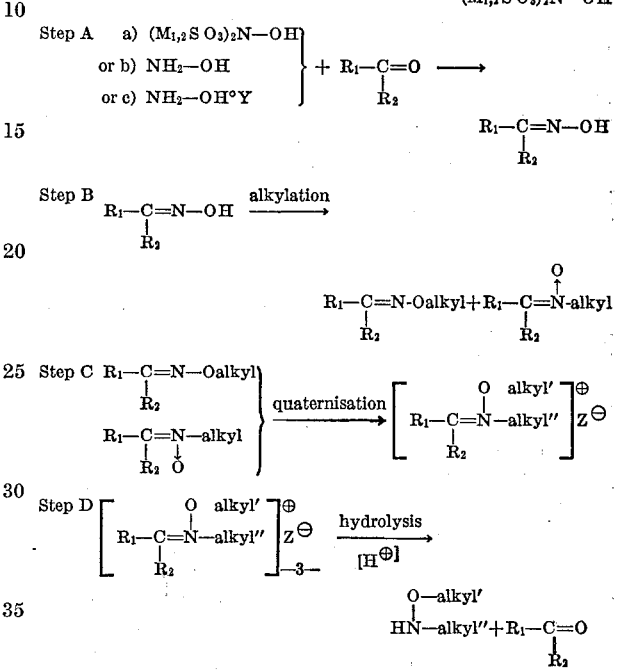

The present invention provides a process for the preparation of N,O-dialkylhydroxylamines wherein hydroxylamine, a salt of hydroxylamine or a hydroxylamine-disulphonate is reacted, with an aldehyde or a ketone, the resulting oximino compound is alkylated with an alkylating agent, the resulting reaction product is quaternised by means of an alkylating agent, with exclusion of moisture, and at a temperature in the range of from 50° to 140° C., to give a corresponding N-alkylidene-N,O-dialkylammonium salt, and this complex salt is hydrolysed in an acid medium.

In the above reaction sequence, $M_1$ and $M_2$, independently of the valency, represent metal cations, preferably alkali metal cations, such as $Na^+$ or $K^+$. $M_{1,2}$ is intended, if $M_1$ is not the same as $M_2$, to represent a mixed cation of $M_1$ and $M_2$ but to denote the particular cation if $M_1$ is identical to $M_2$. Y represents an acid, for example HCl, HBr, $H_2SO_4$ and $H_3PO_4$ in those cases in which hydroxylamine is present as a salt. $R_1$ and $R_2$ are radicals which together with the CO group to which they are bonded represent an aliphatic, aromatic or heterocyclic aldehyde or an aliphatic, aromatic, mixed aliphatic/aromatic, cyclic or heterocyclic ketone. Z represents the radical of the alkylating agent which has become the anion during the quaternisation reaction. One of the substituents alkyl' and alkyl'' represents the alkyl radical initially introduced, and the other represents the second alkyl radical, introduced during the quaternisation reaction.

The preliminary step in the above reaction sequence is an example of the known Raschig process for the preparation of hydroxylamine disulphonate using an inorganic nitrite, a bisulphite and $SO_2$ in a weakly acid solution, and takes place, whilst cooling, at temperatures of from −15° C. to +5° C. Suitable nitrites are especially alkali metal nitrites, for example, sodium nitrite, and the bisulphite is preferably an alkali metal bisulphite, especially sodium bisulphite.

The oximation step (step A) which follows the preliminary step is preferably carried out in the same reaction medium, or alternatively using $NH_2OH$ or one of its salts, preferably using, as carbonyl compound, an aldehyde. Aliphatic aldehydes, for example, acetaldehyde, propionaldehyde and butyraldehyde and especially aromatic aldehydes, for example, benzaldehyde, tolylaldehyde, xylylaldehyde, ethylbenzaldehyde, chlorobenzaldehydes, dichlorobenzaldehydes, and methyl-chloro-benzaldehyde can be used in this reaction.

Ketones can also be used. In addition to aliphatic ketones, for example, acetone, methyl ethyl ketone and diethyl ketone, aromatic ketones, for example acetophenone, propiophenone, fluorenone and benzophenone, and cycloaliphatic ketones, for example, cyclohexanone and cyclopentanone, can also be used.

In principle, the use of the one or other carbonyl compound is not restricted to any particular conditions, as can be seen from the above reaction sequence: the carbonyl compound employed is recovered unchanged in step D and can be returned to the process. Heterocyclic compounds can also be used.

In step B the oxime compound is treated, in the usual manner, with an alkylating agent for example, a methyl halide, an ethyl halide, diazomethane, an α- or β-propionyl halide or a butyl halide, a dialkyl sulphate or an alkyl sulphonate. By halide, there is herein meant a chloride, bromide or iodide. The dialkyl sulphate used is preferably dimethyl sulphate or diethyl sulphate, and the alkylsulphonate is preferably methylsulphonate or ethylsulphonate.

In this reaction step, the oxime-O-alkyl ether and the N-alkylnitrone are produced together in a ratio of from about 5:1 to 1:1. The O-alkyl ether is formed preferentially and if the process is carried out in a predominantly aqueous reaction medium, separates out, in general, as the top layer, whilst the nitrone formed generally remains in the aqueous phase from which it can be isolated by extraction with an organic, water-immiscible solvent, such as ether, chloroform, methylene chloride, ethylene chloride, trichloroethylene, benzene or toluene. The dried and/or distilled reaction products may then be passed, as the mixture, to reaction step C.

Surprisingly, both the oxime-O-alkyl ether and the N-alkylnitrone can be converted, independently of one another or in any desired mixture ratio, quantitatively into the N-alkylidene-N,O-dialkylammonium salt of the formula

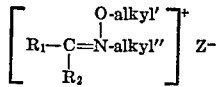

by quaternisation, without interfering side-reactions occuring.

This quaternisation step with exclusion of moisture takes place, as has been mentioned, at temperatures of from 45° to 140° C., preferably between 70° and 110°C., since the complex salt formed becomes unstable at temperatures of above 140° C. and decomposes in an exothermic reaction. The speed of the decomposition depends on the substituents present in the complex.

The quaternisation is carried out with an alkyl halide, for example a methyl halide, an ethyl halide, an α- or β-propionyl halide, a butyl halide or an amyl halide, or with higher halides such as octyl halide or dodecyl halide, or with dialkyl sulphates, for example, dimethyl sulphate or diethyl sulphate.

The yields in step C are, as a rule, about 80% of N-alkylidene-N,O-dialkylammonium salt.

The hydrolysis of the ammonium salt, which is preferably not isolated, in step D is carried out in aqueous solution, especially in the presence of customary organic or inorganic acids, preferably hydrochloric acid, hydrobromic acid, phosphoric acid or sulphuric acid. The hydrolysis can also be carried out at an elevated temperature, using steam in the presence or absence of acids.

If different alkyl radicals have been introduced in steps B and C, two end products are ultimately produced which may separate by customary methods of separation, such as crystallisation, fractional distillation, azeotropic distillation and, if appropriate, column chromatography. If identical alkyl radicals have been introduced, only one end product results.

The following Examples illustrate the invention, the percentages being by weight.

EXAMPLE 1

Preliminary Step 3.9 kg. of 40% $NaHSO_3$ solution are added dropwise, at −5°C., to a solution of 1.05 kg. of $NaNO_2$ in 1.5 litres of water and 1.8 kg. of ice, whilst cooling. 0.87 kg. of $SO_2$ are then passed in at the same temperature. At the end of the reaction, the pH value is 4.

Step A 1.44 kg. of benzaldehyde are rapidly added to the reaction mixture, after which the mixture is heated. When the oximation reaction starts at approx. 50°–60° C., the heating is interrupted. The temperature rises to approx. 80° C., whilst slight cooling is preferably applied. The mixture is then stirred for a further hour at 70° C. On cooling, the benzaldoxime is left as the upper phase and is separated off.

Step B 0.88 kg. of 50% NaOH is added to 1.73 kg. of 70% benzaldoxime in 1 litre of water, at 20°–25° C., whilst cooling. 1.39 kg. of dimethyl sulphate are then added dropwise, whilst cooling, at such a speed that the temperature does not exceed 25° C. After ½ hour, the upper phase, consisting predominantly of benzaldehyde-oxime-O-methyl ether and a little benzaldehyde-N-methyl-nitrone is separated off, whilst the lower phase is extracted three times by shaking with 1 litre of ethylene chloride at a time. After combining the extracts with the upper phase which has been separated off, and distilling off the solvent, 1.7 kg. of oxime-ether of low nitrone content are left.

Step C 1.37 kg. of dimethyl sulphate are added dropwise to 1.7 kg. of oxime-ether/nitrone, whilst excluding moisture, and the mixture is then heated to 100° C., stirred for a further 2 hours and cooled.

Step D

The crude quaternary salt, in the reaction mixture of the 3rd stage, is treated with 1.6 kg. of 10% $H_2SO_4$ at 30°–40° C. After 2 hours the aqueous phase is separated off and neutralised, and the N,O-dimethylhydroxylamine which has separated out is rectified: Yield 0.48 kg. of boiling point 40°–43° C.

The benzaldehyde can be recovered from the organic phase by distillation.

EXAMPLE 2

Step A

1 Mol of acetone (=58 g.) is reacted with 0.55 mol of $(NH_2OH)_2 \cdot H_2SO_4$ (hydroxylamine sulphate) in aqeuous solution, in the presence of 1.1 mols of sodium hydroxide, at maximally 40° C.

Step B 1.1 Mols of 50% sodium hydroxide are then added, and 1.1 mols of dimethyl sulphate are run in dropwise. The mixture is stirred for a further hour at 40° C. and the O-methylacetoxime is extracted with two 100 ml. portions of trichloroethylene. After removing the solvent on a rotary evaporator, 48 g. (=.55 mol) of O-methylacetoxime are obtained. Yield 55% (relative to acetone employed). It was not possible to isolate a corresponding N-methylnitrone.

Step C 0.15 Mol of dry O-methylacetoxime (=13.5 g.) and 0.15 mol (=18.9 g.) of dimethylsulphate are stirred for 1 hour at 65°–70° C.

Step D 30 g. of 10% sulphuric acid are then added to the dark yellow liquid, and the mixture is subsequently stirred for 1 hour at 40° C. The aqueous phase is then separated off, adjusted to pH 9 with 10 ml. of sodium hydroxide solution, and distilled at between 53° C. and and 95° C. 15.7 g. of a crude product are obtained, containing 4.15 g. (=45% yield) of N,O-dimethylhydroxylamine.

EXAMPLE 3

Step A

1 Mol of cyclohexanone (=100 g.) is reacted with 0.55 mol of hydroxylamine sulphate, in aqueous solution, in the presence of 1.1 mols of sodium hydroxide, at maximally 40° C.

Step B 1.1 Mols of 50% sodium hydroxide are then added and 1.1 mols of dimethyl sulphate are run in dropwise. The mixture is stirred for a further hour at 40° C. and the O-methylcyclohexanoneoxime is reacted with two 100 ml. portions of trichloroethylene. After removing the solvent, O-methyl-cyclohexanoneoxime is obtained in 47% yield (relative to the ketone employed). It was not possible to isolate a corresponding N-methylnitrone.

Step C 38 g. (0.3 mol) of dry O-methylcyclohexanoneoxime are stirred with 37.8 g. (0.3 mol) of dimethyl sulphate for 3 hours at 65° C.

Step D

After decomposing the quaternary salt at 40° C. whilst adding water, separating the phase and adjusting the aqueous phase to pH 9 with soidum hydroxide solution, distillation between 52° C. and 93° C. yields 7.5 g. of liquid containing 2.3 g. of N,O-dimethylhydroxylamine (yield 12.3%).

EXAMPLE 4

Step A

1 Mol of butyraldehyde (=72 g.) is reacted with 0.55 mol of hydroxylamine sulphate in aqueous solution, in the presence of 1.1 mols of sodium hydroxide, at maximally 40° C.

Step B 1.1 Mols of 50% sodium hydroxide are then added and 1.1 mols of dimethyl sulphate are run in dropwise. The mixture is stirred for a further hour at 40° C. and the O-methylbutyraldoxime is extracted with two 100 ml. portions of trichloroethylene. After removal of the solvent, O-methylbutyraldoxime is obtained in 65% yield (relative to the ketone employed). It was not possible to isolate a corresponding N-methylnitrone.

Step C 25.5 g. (0.3 mol) of dry O-methylbutyraldoxime are stirred with 37.8 g. (0.3 mol) of dimethyl sulphate for 4 hours at 45° C.

Step D

After decomposing the quaternary salt at 40° C. by means of 10% sulphuric acid, separating the phases and adjusting the aqueous phase to pH 9 with sodium hydroxide, distillation between 48° C. and 93° C. yields 18 g. of liquid containing 11.7 g. of dimethylhydroxylamine. Yield of the last stage: 64% (relative to the oxime-ether).

EXAMPLE 5

Step A 0.27 Mol of furfurol (=26 g.) are reacted with 0.55 mol of hydroxylamine sulphate in the presence of 1.1 mols of sodium hydroxide in aqueous suspension at maximally 25° C.–30° C. The mixture is stirred for a further hour at 25° C.

Step B 1.1 Mol of sodium hydroxide are then added and thereafter 1.1 mols of dimethylsulphate are run in dropwise at 25° C.–30° C. The mixture is stirred for a further hour and is then extracted with two 100 ml. portions of trichloroethylene. After phase separation, and evaporation of the solvent, 9.2 g. of oxime-ether are obtained. Yield 30.6% relative to furfurol.

Steps C and D

The quaternisation of dry oxime-ether (9.2 g.) with 12.6 g. of dimethyl sulphate at 60° C. for 3 hours, after saponification with 10% sulphuric acid, phase separation, adjustment to pH 9 and distillation yields 5.6 g. of liquid, containing approx. 1.2 g. of dimethylhydroxylamine. Yield of the last stage 19.6%, relative to the oxime-ether.

EXAMPLE 6

Step A

1 Mol of p-tolylaldehyde (=120 g.) are reaction with 89 g. (0.54 mol) of hydroxylamine sulphate at 40° C., in the presence of 70 g. (1.75 mols) of sodium hydroxide in 200 ml. of water, to give the oxime.

Step B

A further 28 g. of 50% sodium hydroxide are then added and 126 g. (1 mol) of dimethyl sulphate is added dropwise at 40° C. The mixture is stirred for ½ hour and is subsequently extracted with two 100 ml. portions of trichloroethylene. After evaporation of the solvent, 131 g. of a mixture of oxime-ether, nitrone and a little solvent are obtained. Yield approx. 95% of theory, relative to p-tolylaldehyde.

Step C 131 g. of the dry nitrone/oxime-ether mixture are stirred with 126 g. (1 mol) of dimethyl sulphate for 1 hour at 90° C.

Step D

The quaternary ammonium salt is then decomposed with 10% hydrochloric acid at 110° C., the phases are separated and the aqueous phase is adjusted to pH 9 with sodium hydroxide and is distilled. 54 g. of liquid, containing 37.4 g. of N,O-dimethylhydroxylamine pass over between 42° C. and 93° C. (Yield: 70% relative to the nitrone/oxime-ether mixture).

EXAMPLE 7

Step A

1 Mol of benzaldehyde (=106 g.) are reacted with 89 g. (0.5 mol) of hydroxylamine sulphate at 40° C. in the presence of 70 g. (1.75 mols) of sodium hydroxide in 200 ml. of water.

Step B

A further 28 g. of 50% sodium hydroxide are then added and 170 g. (1.1 mols) of diethyl sulphate are run in dropwise at 40° C. The two-phase mixture is extracted with two 100 ml. portions of ethylene chloride, and the organic phase is concentrated on a rotary evaporator. Yield, 156.1 g. of a mixture of the oxime-ether formed, the nitrone formed and the solvent (approx. 7%). Yield: approx. 95% of theory.

Step C 156.1 g. of the dry oxime-ether/nitrone mixture are stirred with 126 g. (1 mol) of dimethyl sulphate at 95° C. for 2.5 hours.

Step D

The mixture of the quaternary salts is saponified with 10% sulphuric acid at 40° C. After phase separation adjustment of the aqueous phase to pH 9, and distillation, 62 g. of liquid, containing 45 g. of amine, are distilled. (Composition: 82% of O-ethyl - N - methylhydroxylamine and 18% of O-methyl-N-ethylhydroxylamine). Yield: approx. 70%, relative to the oxime-ether/nitrone mixture.

I claim:

1. A process for the preparation of a N,O-dialkylhydroxylamine, which comprises the steps of
    (A) reacting hydroxylamine, a salt of hydroxylamine or a hydroxylamine disulphonate with an aldehyde or a ketone capable of forming an oxime under reaction conditions;
    (B) alkylating the oximino compound obtained in (A) with an alkylating agent;
    (C) quaternising the product obtained in (B) with an alkylating agent with exclusion of moisture at a temperature in the range of from 50° to 140° C. to obtain a N-alkylidene - N,O - dialkylammonium salt of the formula

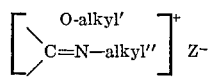

in which alkyl' and alkyl" represent the alkyl radicals introduced in steps (B) and (C) and Z represents the radical originating from the quaternising agent; and
    (D) hydrolysing the N-alkylidene-N,O-dialkyl-ammonium salt obtained in (C) under acid conditions to obtain a N,O-dialkyl-hydroxylamine.

2. A process as claimed in claim 1, wherein, in step A, hydroxylamine is used in the form of its salt with HCl, HBr, $H_2SO_4$ or $H_3PO_4$.

3. A process as claimed in claim 1, wherein, in step A, the hydroxylamine-disulphonate is $(NaSO_3)_2$ N—OH.

4. A process as claimed in claim 1 wherein in step A, the ketone is an aliphatic ketone.

5. A process as claimed in claim 4, wherein the aliphatic ketone is acetone, methyl ethyl ketone or diethyl ketone.

6. A process as claimed in claim 1, wherein, in step A, the ketone is a cycloaliphatic ketone.

7. A process as claim in claim 1 wherein, in step A, the ketone is an aromatic ketone.

8. A process as claimed in claim 7, wherein the aromatic ketone is acetophenone or propiophenone.

9. A process as claimed in claim 1 wherein, in step A, the aldehyde is an aliphatic aldehyde.

10. A process as claimed in claim 9, wherein the aliphatic aldehyde is acetaldehyde, propionaldehyde or butyraldehyde.

11. A process as claimed in claim 1, wherein, in step A, the aldehyde is an aromatic aldehyde.

12. A process as claimed in claim 11, wherein the aromatic aldehyde is benzaldehyde, tolyaldehyde, p-tolyaldehyde, xylylaldehyde, ethylbenzaldehyde, chlorobenzaldehyde, dichlorobenzaldehyde or methylchlorobenzaldehyde.

13. A process as claimed in claim 1 wherein, in step B, alkylation is carried out with a methyl halide.

14. A process as claimed in claim 1 wherein, in step B, alkylation is carried out with diazomethane.

15. A process as claimed in claim 1 wherein, in step B, alkylation is carried out with a dialkyl sulphate.

16. A process as claimed in claim 15, wherein the dialkyl sulphate is dimethyl sulphate or diethyl sulphate.

17. A process as claimed in claim 1 wherein, in step B alkylation is carried out with an alkylsulphonate.

18. A process as claimed in claim 17, wherein the alkylsulphonate is methylsulphonate or ethyl sulphonate.

19. A process as claimed in claim 1 wherein, in step C, the reaction is allowed to take place at a temperature in the range of from 70° to 110° C.

20. A process as claimed in claim 1 wherein, in step C, quaternisation is carried out with an alkyl halide.

21. A process as claimed in claim 20, wherein the alkyl halide is a methyl halide or an ethyl halide.

22. A process as claimed in claim 1, wherein, in step C quaternisation is carried out with a dialkyl sulphate.

23. A process as claimed in claim 22 wherein the dialkyl sulphate is dimethyl sulphate or diethyl sulphate.

24. A process as claimed in claim 1, wherein, in step D, hydrolysis is carried out in the presence of an inorganic acid.

25. A process for the preparation of N,O-dimethylhydroxylamine, wherein hydroxylamine-disulphonate is allowed to react with benzaldehyde, the resulting benzaldoxime is methylated with dimethyl sulphate, the resulting mixture of benzaldehyde-oxime-O-ether and benzaldehyde-N-methylnitrone is quaternised with dimethyl sulphate, with exclusion of moisture, to give the N-benzylidene-N,O-dimethyl-ammonium salt and this complex salt is hydrolysed under acid conditions to yield N,O-dimethyl-hydroxylamine.

26. A process as claimed in Claim 12, wherein the aromatic aldehyde is benzaldehyde.

27. A process of preparing N-alkylidene-N,O-dialkyl-ammonium salts comprising:
    treating a mixture of an N-alkylnitrone and an oxime-O-alkyl ether of the formulae:

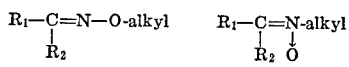

wherein $R_1$ and $R_2$ each represent an aliphatic, cycloaliphatic, aromatic or heterocyclic moiety, with a quaternising agent at a temperature in the range of 45°–140° C. with the exclusion of moisture whereby said nitrone and oxime are both converted to the desired N-alkylidene-N,O-dialkylammonium salts.

28. The process of claim 27 wherein the quarternising agent is an alkyl halide or a dialkyl sulphate.

29. The process of claim 27 wherein the temperature is in the range of 70°–110° C.

30. A process of preparing an N,O-dialkylhydroxylamine which comprises:
    (1) treating a mixture of an N-alkylnitrone and an oxime-O-alkyl ether of the formulae:

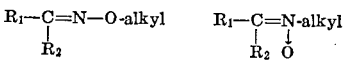

wherein $R_1$ and $R_2$ each represent al aliphatic, cycloaliphatic, aromatic or heterocyclic moiety, with a quaternising agent at a temperature in the range of 45°–140° C., with the exclusion of moisture whereby said nitrone and oxime are both converted to the desired N-alkylidene - N,O - dialkylammonium salts; and
    (2) hydrolysing the N-alkylidene - N,O - dialkylammonium salt prepared in step (1) whereby the desired N,O-dialkylhydroxylamine is obtained.

31. The process of claim 30 wherein the quaternising agent is an alkyl halide or a dialkyl sulphate.

32. The process of claim 30 wherein the hydrolysis is conducted in aqueous acid solution.

References Cited

UNITED STATES PATENTS

| | | | |
|---|---|---|---|
| 3,207,787 | 9/1965 | Levy | 260—583 DD |
| 3,337,631 | 8/1967 | Gerjovich | 260—583 DD |
| 3,178,467 | 4/1965 | Gerjovich | 260—583 DD |

LEWIS GOTTS, Primary Examiner

D. R. PHILLIPS, Assistant Examiner

U.S. Cl X.R.

260—566 F, 583 DD